Patented June 3, 1930

1,761,144

UNITED STATES PATENT OFFICE

WILLIAM MOORE, OF CHAPPAQUA, NEW YORK, ASSIGNOR TO AMERICAN CYANAMID COMPANY, OF NEW YORK, N. Y., A CORPORATION OF MAINE

INSECTICIDE

No Drawing.    Application filed June 7, 1927. Serial No. 197,234.

This invention relates to insecticides, more particularly to a material adapted to be sprayed on plants and the like to eradicate insect and other pests.

It has been known for some time that the nitriles, such as lactonitrile, are good insecticides and they have been used to some extent. However, they are acid in character and they cannot be used in conjunction with most spreading materials, which tend to decompose the nitrile. This may be overcome by the addition of substances such as saponin, as described in the patent to L. J. Christmann, #1,620,074, dated March 8, 1927, but such substances are comparatively rare. It is, therefore, highly desirable to obtain a nitrile in such form that it may be mixed with the comparatively large number of substances ordinarily used as spreaders for insecticides, such as soaps, kerosene, fatty acids and the like.

The present invention is intended and adapted to obviate this disadvantage, it being among the objects thereof to provide an insecticide of the nitrile type which is compatible with a large number of substances and which is stable.

I have discovered that excellent insecticides may be obtained by the use of nitriles having basic properties, that is, nitriles capable of combining with acids, either organic or inorganic. The aminonitriles have this property and I have found them to be excellent insecticides when used alone or in conjunction with other substances. I may use salts of these nitriles and I have combined an aminonitrile, such as aminoisobutyronitrile, with a fatty acid, such as oleic acid to form an oleate. This combination gave excellent results as an insecticide. Many compositions may be made using nitriles of the above type, among which are the following:

*Example 1*

One part of aminoisobutyronitrile was mixed with three parts of oleic acid and the mixture was allowed to stand over night. A little water was incorporated therein after which is was diluted to a ratio of 1 to 100 parts of water. This was used to spray an apple tree infested with the green apple Aphis with the aid of an ordinary bucket spray pump. The kill was practically 100 per cent.

*Example 2*

To a mixture of one part of aminoisobutyronitrile with three parts of oleic acid was added one part of cresylic acid. The mixture was diluted to a ratio of 1 to 100 with water and used as a spray for the green apple Aphis giving considerably over 90 per cent kill.

*Example 3*

A mixture was made containing one part of aminoisobutyronitrile, three parts of oleic acid and two hundred and forty parts of kerosene. Three parts of this mixture diluted with 500 parts of water, gave a 100 per cent kill of green apple Aphis.

*Example 4*

A mixture of equal parts of aminoisobutyronitrile and oleic acid was diluted to 1 to 200 with water and used for spraying the green apple Aphis. Practically 100 per cent kill was obtained.

*Example 5*

The aminonitrile may be used as such without being combined with an acid, provided sufficient soap is added to the solution to give a good wetting of the insects. One part of aminoisobutyronitrile was mixed with 250 parts of soap solution, containing soap in the proportion of two pounds to 50 gallons of water. This mixture gave approximately 100 per cent kill of green apple Aphis.

*Example 6*

A mixture was made containing two parts of aminoisobutyronitrile and one part of oleic acid, and this was rendered homogeneous by the addition of three parts of water. The mixture was diluted to a ratio of 1 to 250 parts of water and a kill of about 50 per cent of the green apple Aphis was obtained.

*Example 7*

In mixtures of the type above set forth it is possible to incorporate material amounts of the ordinary nitriles which are acid in character with a resulting good stability and a high insecticidal effect. One part of aminoisobutyronitrile was mixed with three parts of oleic acid and three parts of acetone cyanhydrin. The mixture was diluted to a ratio of 1 to 250 with water, which gave a kill of 100 per cent on the green apple Aphis. A dilution of 1 to 300 gave a 96 per cent kill.

*Example 8*

Other basic nitriles are also suitable as insecticides. A mixture was made of equal parts of aminopropionitrile and oleic acid, which was diluted to 1 to 250 with water. This gave a kill of over 95 per cent on the green apple Aphis.

From the above examples of the operation of my invention it will be noted that the aminonitriles may be combined in various ratios with other common and inexpensive vehicles for insecticides, which may in themselves have insecticidal value, such as cresylic acid, kerosene and the like. It is also feasible to combine the aminonitriles with acids other than oleic, both organic and inorganic. I have succeeded in making combinations with the common mineral acids, such as hydrochloric acid. I have also combined the aminonitriles with acid radicles having insecticidal properties such as arsenic acid, salicylic acid, benzoic acid, and the like. Nitriles other than acetone cyanhydrin may be added to the aminonitrile compositions, for example, lactonitrile or furfural cyanhydrin. In making the aminonitriles I generally cause a reaction to take place between a cyanhydrin and ammonia, and I may substitute for the ammonia other basic organic substances, such as guanidine. Aromatic aminonitriles are suitable for my purpose, as the compound formed by the reaction between benzaldehyde cyanhydrin and ammonia.

These and other changes may be made in my invention without departing from the principles herein set forth, the scope of the invention being defined in the claims appended hereto.

What I claim is:

1. An insecticide comprising a nitrile having basic properties.
2. An insecticide comprising a nitrile capable of combining with an acid.
3. An insecticide comprising an aminonitrile.
4. An insecticide comprising an aminonitrile and an acid.
5. An insecticide comprising an aminonitrile and a fatty acid.
6. An insecticide comprising an aminonitrile and oleic acid.
7. An insecticide comprising an aminonitrile and oleic acid, the aminonitrile being the major constituent.
8. An insecticide comprising aminoisobutyronitrile.
9. An insecticide comprising aminoisobutyronitrile and an acid.
10. An insecticide comprising aminoisobutyronitrile and oleic acid.
11. An insecticide comprising a salt of a nitrile.
12. An insecticide comprising a salt of aminoisobutyronitrile.
13. An insecticide comprising a salt of an aminonitrile.
14. An insecticide comprising a salt of aminoisobutyronitrile, mixed with water.
15. An insecticide comprising a salt of aminoisobutyronitrile mixed with a free fatty acid and water.
16. An insecticide comprising a salt of an aminonitrile and a nitrile.

In testimony whereof, I have hereunto subscribed my name this 2nd day of June, 1927.

WILLIAM MOORE.